United States Patent Office 3,103,133
Patented Sept. 10, 1963

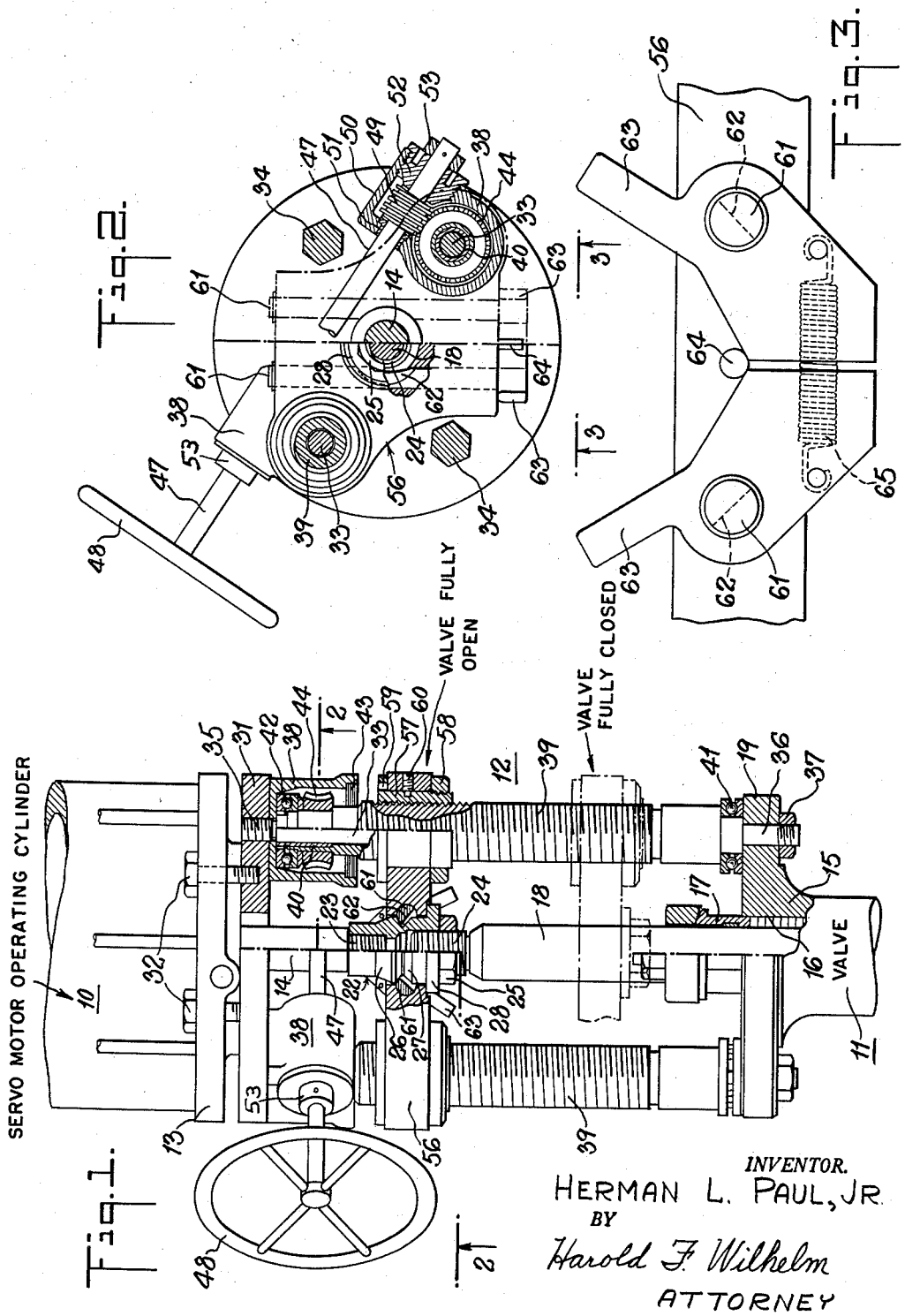

3,103,133
EMERGENCY CONTROL FOR POWER-OPERATED VALVES
Herman L. Paul, Jr., Packanack Lake, N.J., assignor to Consolidated Electrodynamics Corporation, Pasadena, Calif., a corporation of California
Filed Nov. 30, 1960, Ser. No. 72,594
6 Claims. (Cl. 74—625)

The invention relates to remote or automatic power-operated valves for control of fluid flow, and more particularly to auxiliary manual controls for such valves.

With valves of the above type it is often desirable to have an auxiliary manually operated mechanical operator at the valve for emergency and other purposes. Normally, the mechanical operator is disconnected and the valve operates under exclusive control of its power operated servo-motor; but in an emergency a clutch may be thrown and the valve placed under manual operation and under direct control of an attendant.

Auxiliary mechanical controls of the above type are open to one or more of the following objections: they require too much room; they are too complicated; they bind; or they require too much manual effort to operate them. Objects of the invention are to overcome these objections and to provide an auxiliary mechanical valve operator having superior characteristics.

In its preferred form, the auxiliary mechanical operator is used with a valve having its valve rod aligned with the piston rod of an operating air cylinder directly above the valve. A coupling sleeve connects the two rods. The auxiliary mechanical operator comprises a pair of mandrels suitably secured to both the air cylinder and the valve. Journalled on the mandrels are rotary machine screws. The screws support worm wheels driven by worms mounted on a horizontal handwheel shaft. The handwheel shaft is journalled in suitable bearings secured to the operating cylinder.

According to the preferred form of the invention, a cross bar extends between the two rotary screws. This cross bar carries adjustable nut assemblies engaging their respective rotary screws. Each nut assembly comprises a main nut and an auxiliary nut threaded on the outside of the main nut to clamp the nut assembly against the cross bar. The main nuts have internal machine threads engaging external machine threads on the rotary screws. The nut assemblies may be adjusted in a rotary direction by loosening the auxiliary nuts and rotating the main nuts to equalize the loads on the nuts; after load equalization the lock nuts may be tightened and the main nuts may be pinned in adjusted position to the cross bar.

According to the aforesaid preferred form, a clutch arrangement connects the cross bar to the coupling sleeve. The clutch comprises abutments on the coupling sleeve which interengage with abutments on the cross bar and on a pair of rotary shafts journalled in the cross bar and disposed on either side of the coupling sleeve.

During normal operation of the valve by its air cylinder, the cross bar occupies a stand-by, idle position adjoining the air cylinder. When it is desired to control the valve by the auxiliary mechanical operator, the attendant turns the handwheel to lower the cross bar which engages the clutch. The attendant may then fully control the valve, opening or closing it, by turning the handwheel in the proper direction. To free the valve from manual auxiliary control the attendant disengages the clutch by squeezing a pair of pincer levers attached to the clutch shafts and turns the handwheel to place the cross bar in top idle stand-by position.

Other objects and features of the invention will be more apparent from the following description when considered with the following drawings, in which:

FIG. 1 is an elevation, partly in section, of an air-cylinder operated valve showing the auxiliary operator in engaged position;

FIG. 2 is a transverse section, taken on the line 2—2 of FIG. 1, and looking upwards in the direction of the arrows;

FIG. 3 is a view, looking in the direction of the arrows 3—3 of FIG. 2, illustrating the clutch operating finger levers.

In the following description and in the claims, various details are identified by specific names, for convenience, but they are intended to be as generic in their application as the art will permit.

Like reference characters denote like parts in the several figures of the drawings.

In the accompanying drawings and description forming part of this specification, certain specific disclosure of the invention is made for purposes of explanation, but it will be understood that the details may be modified in various respects without departure from the broad aspect of the invention.

Referring now to the drawing, the servo-motor which is shown in the form of an air cylinder is denoted by 10, the fluid controlling valve by 11 and the auxiliary operator by 12. The operating cylinder 10 has a head 13 through which projects piston rod 14.

The valve 11 comprises a bonnet 15 containing a stuffing box 16 closed by a gland 17 through which valve rod 18 passes. It is preferred to use a valve following the teachings of Paul Patent 2,666,617, dated January 19, 1954. The internal mechanism of the valve is based on FIGS. 1 to 7 of the patent where the operating rod is attached to the end of the actuator cage adjacent the locking wedge. The bonnet 15 corresponds to the bonnet 11 of the patent. Bonnet 15 is equipped with an upper plate 19 for purposes hereinafter described.

It will be understood that for simplicity only so much of the operating cylinder 10, and of the valve 11, is shown as is necessary to understand the invention. Any form of servo-motor and any form of valve may be used, which is of such construction to lend itself to use with the present auxiliary operator.

In the position shown in FIG. 1, the valve stem 18 is in its uppermost position and the valve 11 is full open. The lowermost position of the valve stem 18 corresponds to the dot and dash position of the cross bar 56; this corresponds to the full closed position of the valve 11.

The operating cylinder rod 14 and the valve rod 18 are connected by a coupling sleeve 22 screwed onto a reduced end 23 of the operating rod 14 and onto a reduced extension 24 of valve rod 18. A lock nut 25 locks the piston rod 18 in position in the coupling sleeve 22, and the coupling sleeve is jambed up against a shoulder on the operating rod 14.

The coupling sleeve 22 has an upper conical cam surface 26, an annular groove 27 and a shoulder 28 forming part of a clutch mechanism whose structure and operation will be described more in detail hereinafter.

The auxiliary operator 12 further comprises an upper plate 31 secured to the operating cylinder 10 by machine screws 32. A pair of mandrels 33, and a pair of hexagonal columns 34, connect operating cylinder plate 31 and valve plate 19. Both mandrels and hexagonal rods have reduced threaded upper ends, one of which is indicated by 35, threaded into the upper plate 31; these members have reduced lower ends, one of which is indicated by 36, located in holes in valve plate 19 and secured by lock nuts 37.

The hexagonal columns 34 may be the same members that serve to hold the valve and operating cylinder in proper spaced relation when no auxiliary operator is used.

The handwheel shaft 47 supports the handwheel 48 and a pair of worms 49. The handwheel shaft 47 is journalled in housings 38 held up against the top plate 31 by shoulders on the mandrels 33.

The housings 38 are of inverted cup-shape, having open bottoms with tubular offsets 50. Each offset 50 carries a bronze bushing 51 and a removable bushing 52, which provide bearings for the handwheel shaft 47. Collars 53 are pinned on shaft 47 to hold the shaft in proper axial position. The handwheel shaft 47 has keyed thereon worms 49, which are provided with thrust washers bearing against their respective bushings 51 and 52.

Journalled on the mandrels 33 are rotary machine screws or spindles 39. These spindles have upper and lower sleeve bushings 40, a lower end ball thrust bearing 41 and an upper end ball thrust bearing 42. The lower thrust bearing 41 acts against a shoulder on the rotary spindle and the upper thrust bearing 42 acts against the bottom of housing 38. The spindles have keyed thereto worm wheels 44 which mesh with worms 49. Seals 43 close the housings 38.

The cross bar 56 is shaped in plan, as indicated in FIG. 2. It has a central opening to clear the coupling sleeve 22 and connected rods; and it has end openings for nut assemblies. Each nut assembly comprises a main nut 57 having a flange head with spanner holes 59 and a lock nut 58. A set screw or lock pin 60 is threaded into the cross bar 56 and set into the main nut 57.

It will be understood that the nut assemblies may be adjusted in a rotary direction by loosening auxiliary nut 58, rotating the main nut 57 and then setting the set screw 60 at the desired adjusted position. After the mechanical operator is assembled between air cylinder and valve, it is necessary to adjust at least one of the nut assemblies to insure that the travelling mechanism, including the cross bar 56 and all members supported thereby, is equally supported by both nut assemblies. This is to prevent binding.

For connecting and disconnecting the cross bar 56 to the coupling sleeve 22, a clutch arrangement is provided. The clutch comprises a pair of horizontal parallel rods 61 passing through openings in the cross bar 56 on either side of the opening for the coupling sleeve 22. Each rod 61 has a half-round section 62 intersecting the cross bar opening, as indicated in FIG. 1. Finger levers 63 are keyed to the ends of rods 61. Levers 63 are yieldably urged toward each other by a spring 65, the levers being stopped by a pin stop 64.

It will thus be seen that by turning the handwheel 48, the spindle sleeves 39 will be rotated, which move the nut assemblies and cross bar 56 up or down, depending upon the direction in which the handwheel 48 is rotated.

The auxiliary operator is shown in FIG. 3 with the clutch engaged; that is to say, the cross bar 56 engages clutch shoulder 28 and the half-round portion 62 engages the wall of groove 27. In this position the valve is under complete control of the handwheel 48.

The position of the cross bar 56, shown in FIG. 1, corresponds to the uppermost or full open position of the valve. No further upward movement of the cross bar can take place with the clutch engaged, because of the limiting action of the valve. However, the handwheel 48 may be turned to move the cross bar 56 down to the lowermost position, shown in dot-dash lines, to completely close the valve 11. Or, the handwheel may be turned to move the cross bar 56 to any position between the full line and dot-dashed line position to place the valve in any intermediate position from full open to full closed.

Normally, during operation of the valve under control of the operating cylinder 10, the cross bar will be positioned in idle stand-by position above the position shown in full lines. This position may be attained by pressing the finger levers 63 together to disengage the half-round sections 62 with the upper surface of groove 27, which disengages the cross bar 56 from the coupling 22; and then turning handwheel 48 to raise the cross bar to the limit of its upward movement. The coupling sleeve 22 will then have full range of vertical operating movement under control of the operating cylinder without engaging the clutch.

Upon a condition arising where it is desired to place the valve under control of the auxiliary operator, it is only necessary to turn the handwheel 48 to move the cross bar 56 downwardly from its uppermost, stand-by position. The half-round sections 62 of the clutch will then ride down the cam surface 28 until the cross bar 56 engages shoulder 28, when the half-round sections 62 will rotate to the locked position shown; this engages the clutch and places the coupling sleeve 22, and valve rod and cylinder rod, under complete manual control of the handwheel 48.

When it is desired to remove the automatic valve from manual control, it is only necessary to press the finger levers 63 together to disengage the clutch, turn the handwheel 48 in such direction as to raise the cross bar 56 and move the cross bar 56 to uppermost stand-by position.

Thus it will be seen that an auxiliary mechanical operator is provided for an automatic or power-operated valve which does not require any additional spacing between operating cylinder and valve; it eliminates binding, is easy to operate, and is reliable. Due to the absence of binding and because of the use of worm wheel drive, heavy valve mechanism can be operated by relatively small manual effort on the part of the attendant turning the handwheel 48. This equipment may be used with valves of any size as, for example, 2-inch valves up to 14 inches and higher.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a power-operated valve system, a valve comprising a stationary support, a servo-motor comprising a stationary support, means operating said valve by said motor including a movable operating member, means holding said supports in spaced alignment, a pair of rotary screw members, means journaling said rotary screw members in parallelism between said casings, gears on said rotary screw members, a control shaft, means journaling said control shaft in fixed relation to one of said casings, gears on said control shaft meshing said rotary screw member gears, a cross member, nuts on said cross member having screw threads engaging said rotary screw members, means for adjusting at least one of said nuts on said cross member, and disengageable means connecting said operating member and said cross member.

2. In the system of claim 1, said disengageable means comprising clutch elements on said cross member and on said operating member, said operating member clutch elements having a predetermined range of movement when the valve is operated by said servo-motor, said cross member having a stand-by position beyond said range of movement, means causing said cross member clutch elements to automatically engage, and interlock with, said operating member clutch elements when said cross member is moved into the range of movement of said operating member clutch elements.

3. In a power-operated valve system, a valve comprising a stationary support and having a rod projecting therefrom, a servo-motor comprising a stationary support and having a rod projecting therefrom, a coupling connecting said rods, a pair of spindles connecting said supports and disposed on opposite sides of said coupling, rotary screw sleeves journaled on said spindles, worm wheels on said rotary sleeves near one of said supports, housings secured to last-mentioned support and surrounding said worm wheels, said housings having offset portions, a hand wheel shaft journaled in said offset portions, worms on said hand wheel shaft meshing with said worm wheels, a cross bar having openings for said screw sleeves and said coupling, nut assemblies in said cross bar openings, said nut assemblies having screw thread engagement with said screw sleeves, means for adjusting at least one of said nut assemblies in said cross bar, and clutch means for connecting said cross bar and coupling.

4. In the system of claim 3, said clutch means comprising first and second abutments on said coupling, first and second abutments on said cross bar, said second cross bar abutment being movable with respect to said cross bar, all other abutments being fixed with respect to their respective supports, said coupling having a cam surface over which said movable abutment rides, biasing means to hold said movable cross bar abutment in engagement with said second coupling abutment.

5. In a power-operated valve system, a valve having a top plate and having a rod projecting upwardly therefrom, an operating cylinder having an end plate and a piston rod projecting downwardly therefrom, a coupling connecting said rods, a pair of spindles connecting said valve plate and cylinder plate and disposed on opposite sides of said coupling, rotary screw sleeves journalled on said spindles, worm wheels on said rotary sleeves near the tops thereof, housings suspended from said cylinder plate and surrounding said worm wheels, said housing having offset portions, a hand wheel shaft journaled in said offset portions, worms on said hand wheel shaft meshing with said worm wheels, a cross bar disposed below said hand wheel shaft, said cross bar having openings for said screw sleeves and said coupling, nut assemblies in said cross bar openings, said nut assemblies having screw thread engagement with said screw sleeves, means for circumferentially adjusting said nut assemblies in said cross bar, and clutch means between said cross bar and coupling.

6. In a power-operated valve system, first and second supports, one support being stationary, the other support being movable, a valve and a servo-motor forming part of said stationary support, means for operating said valve by said motor including a movable operating member, said valve system being characterized by a pair of spaced rotary threaded members journalled in parallel on said first support, a control shaft journalled on said first support, worms on said control shaft meshing worm wheels on said rotary members, a pair of non-rotary threaded members on said second support, said rotary threaded members having screw threaded engagement with said non-rotary threaded members, detachable means for connecting said operating member with said movable support, at least one of said threaded members being adjustable with respect to its corresponding parallel threaded member to equalize load between the spaced threaded members.

References Cited in the file of this patent
UNITED STATES PATENTS
2,885,172    Nadho _____ May 5, 1959